United States Patent
Chang

(10) Patent No.: US 8,232,918 B2
(45) Date of Patent: Jul. 31, 2012

(54) DIGITAL BEAM-FORMING APPARATUS AND TECHNIQUE FOR A MULTI-BEAM GLOBAL POSITIONING SYSTEM (GPS) RECEIVER

(75) Inventor: Donald Chin-Dong Chang, Thousand Oaks, CA (US)

(73) Assignee: Spatial Digital Systems, Inc., Chatsworth, CA (US)

(*) Notice: Subject to any disclaimer, the term of this patent is extended or adjusted under 35 U.S.C. 154(b) by 0 days.

(21) Appl. No.: 13/229,432

(22) Filed: Sep. 9, 2011

(65) Prior Publication Data

US 2011/0316739 A1    Dec. 29, 2011

Related U.S. Application Data

(62) Division of application No. 12/841,801, filed on Jul. 22, 2010, now Pat. No. 8,035,562, which is a division of application No. 12/115,232, filed on May 5, 2008, now Pat. No. 7,786,933.

(60) Provisional application No. 60/930,954, filed on May 21, 2007.

(51) Int. Cl.
*H01Q 3/00* (2006.01)

(52) U.S. Cl. .................. 342/368; 342/377

(58) Field of Classification Search .................. 342/368
See application file for complete search history.

(56) References Cited

U.S. PATENT DOCUMENTS

| | | | | |
|---|---|---|---|---|
| 5,559,519 A * | 9/1996 | Fenner | ............... | 342/174 |
| 6,127,966 A * | 10/2000 | Erhage | ............... | 342/174 |
| 6,664,921 B2 * | 12/2003 | Pratt | ............... | 342/357.63 |
| 7,304,605 B2 * | 12/2007 | Wells | ............... | 342/357.62 |

* cited by examiner

*Primary Examiner* — Gregory C Issing
(74) *Attorney, Agent, or Firm* — O'Melveny & Meyers LLP

(57) ABSTRACT

An advanced multiple-beam GPS receiving system is achieved that is capable of simultaneously tracking multiple GPS satellites independently, detecting multiple interference signals individually, and suppressing directional gain in the antenna pattern of each beam in the interference directions. The GPS receiving system can be used for both planar and non-planar receiving arrays, including arrays that are conformally applied to the surface of a platform such as an aircraft. The GPS receiver combines spatial filtering and acquisition code correlation for enhanced rejection of interfering sources. Enhanced gain in the direction of GPS satellites and the ability to shape the beam patterns to suppress gain in the direction of interfering sources make the GPS receiving system largely insensitive to interfering and jamming signals that plague conventional GPS receivers.

4 Claims, 5 Drawing Sheets

DIGITAL BEAM-FORMING APPARATUS AND TECHNIQUE FOR A MULTI-BEAM GLOBAL POSITIONING SYSTEM (GPS) RECEIVER

RELATED APPLICATION DATA

This application is a divisional application of U.S. patent application Ser. No. 12/841,801, filed Jul. 22, 2010, now issued as U.S. Pat. No. 8,035,562 on Oct. 11, 2011, which is a divisional application of U.S. patent application Ser. No. 12/115,232, filed May 5, 2008, now issued as U.S. Pat. No. 7,786,933 on Aug. 31, 2010, which in turn claims the benefit, pursuant to 35 U.S.C. §119(e), of U.S. Provisional Application Ser. No. 60/930,954, filed May 21, 2007.

BACKGROUND OF THE INVENTION

1. Field of the Invention

The present invention relates to architectures and designs of Global Positioning System (GPS) receiving systems. In particular, the invention relates to the design of multiple-beam antennas using digital beam forming techniques to enable dynamic tracking of all GPS satellites within the field of view of the aperture.

2. Description of Related Art

It is well known in the art to use the NAVSTAR GPS satellite constellation to determine receiver location and obtain navigation information. The basic NAVSTAR constellation comprises twenty-four satellites orbiting in six orbital planes. Each orbital plane is inclined with respect to the equator by fifty-five degrees, and they are separated by sixty degrees right ascension. In each of the six orbital planes, four satellites are evenly spaced along a nearly circular orbit. This arrangement assures that between four and twelve satellites are visible above an observer's horizon at any given time. However, the satellites will be observed near the observer's horizon the majority of the time. FIG. 1 illustrates the relative time that a GPS satellite passing through the local zenith will be visible as a function of elevation angle. A user has about 40% more time to observe the GPS satellite traveling over an elevation angle near the local horizon than that near the local zenith, and for satellites not reaching local zenith, the time spent near the local horizon is even greater. For airborne receiving platforms in particular, the majority of GPS signals arrive at low elevation angles. However, typical GPS receiving systems employ largely isotropic, low-gain antennas in order to simultaneously view large regions of the sky. Besides wasting much of the antenna gain in directions with low payoff, such isotropic receivers also increase the system's susceptibility to interference signals, especially during aircraft final approach and landing. Therefore, it would be desirable to design antennas for receiving GPS signals that exhibit better directional gain and that are better able to discriminate toward low elevation angles.

The low broadcast power of GPS signals makes them susceptible to interference. The interference/signal (I/S) power ratio is a function of the distance and transmission power of the interfering source. Because the current generation of GPS terminals relies on using the relatively susceptible coarse acquisition (C/A) code for signal acquisition, receivers are readily disabled by interfering sources. Even low-power interfering sources can have a drastic effect on GPS receivers at a significant distance from the interfering source. Conventional low-gain antennas cannot discriminate between GPS signal sources and interfering sources. Thus, it would be desirable to provide a receiving antenna system that could dynamically provide gain in the direction of the desired GPS sources while suppressing interfering sources by suppressing antenna gain in the directions of the interfering sources.

SUMMARY OF THE INVENTION

An advanced multiple-beam GPS receiving system is achieved that is capable of enhancing receiving sensitivity in the direction of GPS sources using multiple dynamic narrow beams with high gain, detecting multiple interference signals individually, and simultaneously suppressing gain in the antenna patterns of the multiple beams in the directions of interfering sources. The receiving antenna comprises an array of antenna elements that need not be co-planar. Key factors in the performance of the array include the number of antenna elements and the spacing (base-lines) of the elements. As the number of elements increases, more control over the shaping of the antenna patterns is achieved. The number of separate interfering sources that can be suppressed by pattern shaping is equal to one less than the number of "available" elements (N−1). The angular width of the suppression features depends on the overall aperture size, and more precisely, on the maximum distance (base-line) between array elements.

It is desirable to maintain a small aperture size for a user terminal, but with better antenna gain toward GPS satellites and discrimination against interferences at low elevations. A receiving system in accordance with the present invention produces multiple high-gain spot beams from a GPS receiving array by using digital beam forming (DBF) techniques. The system provides multiple, simultaneous anti-interference links between GPS satellites and the user. The multi-beam antenna not only provides connectivity but also ensures isolation from and discrimination against interference sources, particularly at low elevation angles. The multi-beam antenna receiving system addresses challenges in three key areas: (1) keeping aperture sizes small, (2) dynamically maximizing gain in the direction of low-elevation GPS satellites, and (3) dynamically forming deep gain suppression features in the direction of low-elevation interference sources while minimizing impacts on GPS satellite reception.

An embodiment of a GPS receiving system in accordance with the present invention comprises an aperture composed of multiple antenna elements configured as a receiving array. The array may be configured as a contiguous, planar aperture, or as a non-planar, non-contiguous array comprised of distributed sections. In particular, the aperture could be distributed as multiple arrays applied conformally to the surface of a platform such as an aircraft or other vehicle. The receiving system includes a low-noise amplifier (LNA) section to amplify and condition the received low-intensity GPS signals, and a down-conversion section to frequency down-convert the received GPS radio-frequency signals to an intermediate or baseband frequency for further processing. A digital beam forming (DBF) processor applies appropriate beam weighting vectors to the signals received from each of the elements of the array to create one or more coherent beams from the received GPS signals. All of the elements may be combined into a single broad-area beam, or multiple simultaneous high-gain beams covering the same broad area. Alternatively, various selected elements may be combined to form different simultaneous beams, each of which may be independently steered by the array processor. The DBF processor employs digital numerical techniques to generate a beam by multiplying, or weighting, each of the signals received from the elements of the antenna array. Each signal is multiplied by the associated component of the beam weighting vectors (BWVs), and the weighted signals are then summed together. Different types of beams are generated by different BWVs.

Multiple simultaneous beams are generated by parallel processing the same array signals using different and independent BWVs. Each BWV is associated with a unique array aperture distribution, resulting in a unique antenna pattern in the far field. The beam weighting vectors may include phase correction factors, time-delay correction factors, and amplitude correction factors of unbalanced arrays. Thus, the hardware equalization and beam forming is accomplished in a single arithmetic operation. Similarly, the DBF processor may alter the direction of a beam by multiplying the received element signals by different BWVs and then summing the weighted signals together. In principle, the BWVs can be altered as often as the signal sampling interval.

The beams created by the DBF processor may be configured so that each beam is associated with a GPS satellite currently within the array field of view (FOV), and the associated beamwidth may vary from as large as the entire FOV to a small portion of the FOV. Roughly speaking, the minimum angular coverage of an array of N identical elements, the array-equivalent beamwidth, is approximately one Nth of the total FOV. Motions of each of the satellites, due either to the orbital motions of the satellites or to the motion of the receiving platform, can be tracked out by adjusting the beam weighting factors applied by the DBF processor in order to steer the beams to follow the angular position of the GPS satellites. Alternatively, the DBF processor may create multiple fixed sector beams, each of which points to a fixed location within the field of view of the aperture. Such beams may be useful for detecting the location of a desired or undesired signal.

The DBF processor is also able to shape the antenna pattern to create directional gain suppression features by appropriately selecting beam weighting vectors to apply to the signals received from each of the elements of the array. In general, by selecting antenna elements that are spatially separated by a large distance, very deep and narrow suppressions of the gain pattern can be created. This directional suppression can then be steered by the DBF processor to lie on top of interfering sources within the array FOV.

The gains of the multiple beams created by the DBF processor also allow for discrimination between spatially separated sources that may operate at close to the same frequency. In particular, the GPS receiving system can discriminate between angularly separated GPS satellites operating using different signaling and coding standards, for example, NAVSTAR, Compass, and Galileo. A multi-channel receiver correlates the GPS codes from the one or more beams created from the array elements. The correlated codes are then passed to a GPS position processing unit that extracts time and location data.

Downstream of the DBF processor is an array processor that functions to connect the beam outputs to proper correlators in a multi-channel receiver. Several correlators in the multi-channel receiver may be assigned to each beam. Only the codes associated with the GPS satellites within the beam coverage area are available to the correlators assigned to that beam. The combination of a high-gain GPS tracking beam and the unique code assignment to the designated correlators in the multi-channel receiver provides enhanced discrimination ability. The receiver will respond only to signals that both arrive from the limited angular width of the selected beam and have the proper GPS code signature. As a result, interference from multi-path effects and low-power smart spoofing sources are significantly reduced.

The GPS receiving system provides a number of methods for finding the location of a signal source. First, the receiver may perform a binary search by first dividing the array into two half-beams, each looking at half of the field of view of the aperture. The received signals from each half-beam can be independently processed to look for the signal to determine in which of the two half beams the signal lies. The identified half beam can then be further subdivided into two quarter beams and the process repeated until the direction of the source is known with sufficient accuracy for the application.

Second, the location of a spoofing or interfering GPS source can be located by forming a number of sub-beams, each of which is configured to track one of the satellites within the field of view. An analysis of the data from all of the GPS sources can be performed to obtain reference location information. Then, the sub beam pointing at a particular source can be turned off or otherwise removed from the multi-channel receiver, and the location analysis can be repeated. This process can then be repeated for each of the GPS sources in turn, and the results of the location analysis can be compared to determine which of the beams contains the spoofing GPS signal. If multiple interfering sources are present, this method can be repeated, turning off two of the GPS sources at a time to find the interferers.

The ability to effectively point the array and to create sub-beams depends on the accuracy of a calibration process designed to determine beam weighting factors to be applied to each of the elements of the array for a particular pointing direction. Such calibrations can be particularly challenging for non-planar arrays in which antenna elements are located in different planes and may be oriented in different directions. A method in accordance with the present invention solves this problem. A signal generating unit with an associated antenna is placed in the far field of the array to be calibrated in a laboratory or test-range setting. The signal generator is configured to transmit a coded acquisition sequence. The calibration signal is received by the elements of the array, and a correlator is used to synchronize with a recorded coded acquisition sequence including a time reference to determine the range to each of the antenna elements. Alternatively, the signal from one of the array elements may be selected as a reference source. The signal from each of the remaining array elements may then be cross correlated with the selected reference source, taking into account the range variation information and the unbalanced amplitudes and phases (or biases) among the multiple RF channels, to calculate the proper beam weighting vectors required to achieve a coherent sum of all the elements for the chosen calibration position. These beam weighting factors are saved in the array processor memory, and a new location is selected for the calibration source. The process is repeated for a number of different calibration source angles to create a set of beam weight vectors associated with each element for each array pointing angle. Angles between the points that are calibrated can be determined by interpolation, and the number of measured points will depend on the required accuracy of the pointing for the particular application.

From the foregoing discussion, it should be clear to those skilled in the art that certain advantages of an advanced multiple beam GPS receiving system have been achieved. Further advantages and applications of the invention will become clear to those skilled in the art by examination of the following detailed description of the preferred embodiment. Reference will be made to the attached sheets of drawing that will first be described briefly.

DETAILED DESCRIPTION OF THE PREFERRED EMBODIMENT

The invention provides an advanced multi-beam GPS receiving system that is capable of detecting multiple interference signals and suppressing gain in the antenna pattern in the interference directions. In the detailed description that follows, like element numerals are used to indicate like elements appearing in one or more of the figures.

Figure 1:
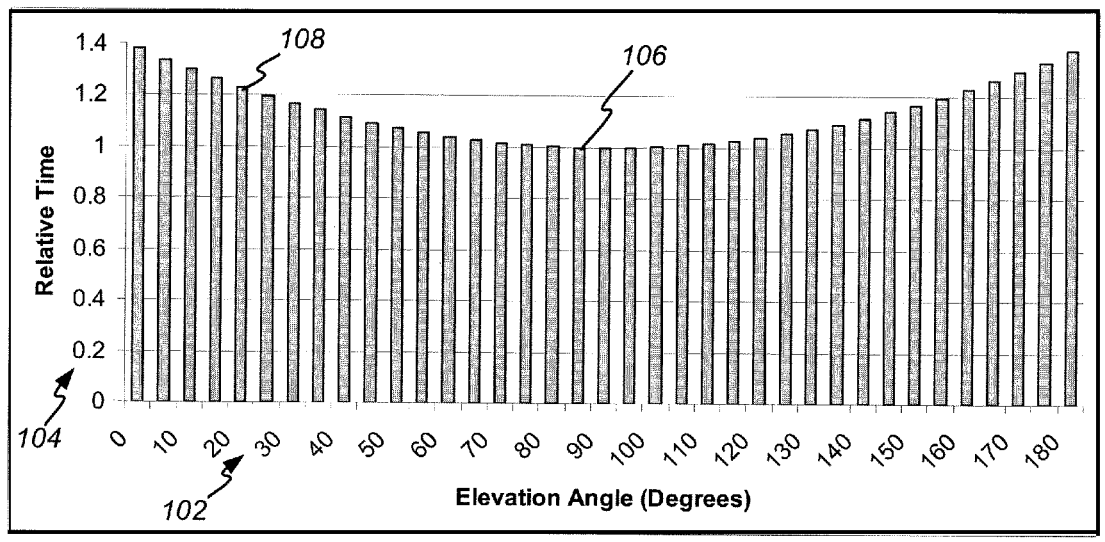
FIG. 1 depicts the relative time that a GPS satellite crossing local zenith will spend at various elevation angles.

FIG. 1 illustrates that GPS constellation satellites tend to spend the majority of time relatively low on the horizon, from the point of view of an observer, either on the ground or on an airborne platform. In particular, the relative time spent 104 at a particular elevation angle 102 is plotted with respect to the time spent within five degrees of zenith 106, which is normalized to one. For example, bin 108 illustrates that the time a satellite is observed within five degrees of a twenty-five-degree elevation angle is approximately 20% greater than the time spent near zenith, for a satellite that passes through local zenith. For satellites that do not pass directly overhead, the visible duration at low elevation angles is even more pronounced, illustrating the inefficiency of conventional GPS antennas that are largely omni-directional.

Figure 2:
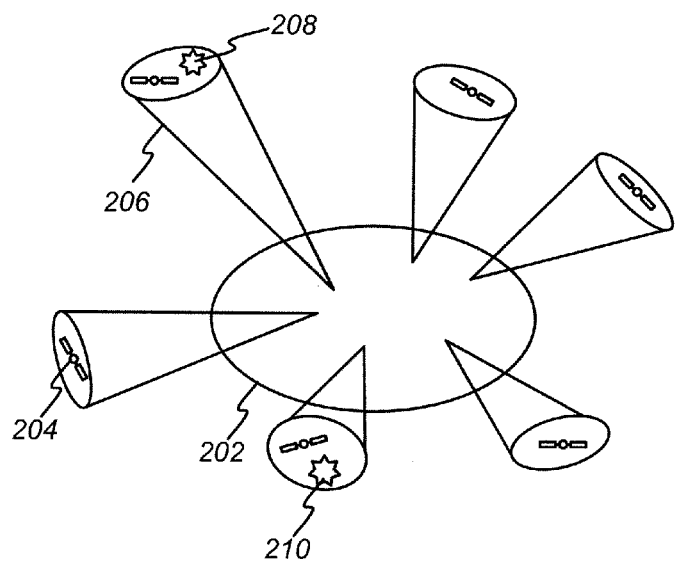
FIG. 2 illustrates the operation of a multi-beam receiving aperture in accordance with the present invention.

FIG. 2, by contrast, illustrates a beam pattern produced by an embodiment of a GPS receiving system in accordance with the present invention. An aperture 202 comprising multiple antenna array elements (not shown) is organized by a DBF processor to form multiple simultaneous beams, each capable of viewing a GPS satellite, e.g., 204, simultaneously. With a non-planer conformal aperture, not all array elements will view all GPS satellites in the sky due to blockage of the aperture itself. However, the more elements of the non-planer conformal array that can view a GPS satellite 204 at a given time, the more antenna gain toward the satellite direction the array will provide through the beam forming process. As the satellite and/or the user platform move, some of the array elements may become blocked, but additional elements may become available. An array processor automatically selects a new set of elements to form a beam pointing in the new direction to track the moving satellite. FIG. 2 illustrates six such beams, e.g., 206, formed to track the individual GPS satellites, e.g., 204, within view of the aperture 202. Two of the beams in this example are subject to strong interference sources 208 and 210 that would normally have a devastating affect on the ability of the receiver to extract position data from the constellation. However, by shaping the beams to place deep, narrow gain suppression features in the direction of the interfering sources, the receiver is able to provide each beam, e.g., 206, with a strong directional selection capability that can overcome the interference.

With respect to the directional gain suppression features, the array resolution capability, rather than the array gain, becomes the dominant design consideration. The depth of the gain suppression feature is related primarily to the accuracy of phase and amplitude weighting performed in the DBF processor, and the angular width is related to the maximum element spacing, or baseline, projected normal to direction of the interfering signal, where the baseline is defined as the distance between the two outermost elements selected for arraying. It should be noted that the array elements selected to form a given beam need not be contiguous. The array processor thus acts to select elements that produce the maximum baseline on a projected plane normal to the interference direction.

Figure 3:
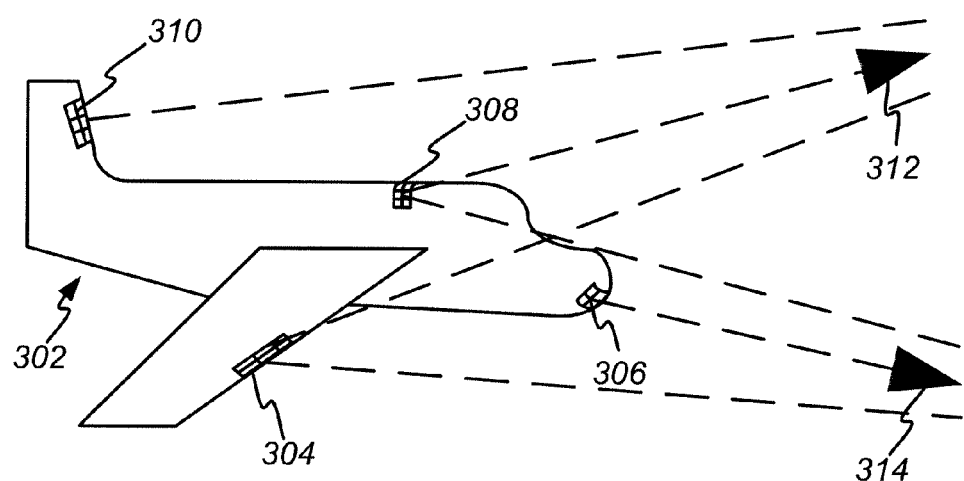
FIG. 3 illustrates a conformal, non-planar, multi-beam receiving aperture mounted on the surface of an aircraft, in accordance with the present invention.

FIG. 3 presents an example of a conformal, non-planar receiving aperture in accordance with an embodiment of the present invention. In this case, the aperture comprises spatially separated array portions conformally mounted on the surface of an aircraft 302. For example, some array elements are located on the wing 304, others on the nose 306, others on the top 308 of the aircraft, and others on the tail 310. In the figure, the formation of beams in two different directions, 312 and 314, corresponding to directions in which two GPS satellites are located, is illustrated. The satellite in the direction of 312 is not visible from the array elements 306 mounted on the nose of the aircraft. Thus, elements from the wing 304, the top 308, and the tail 310 are used to construct the beam pointing in that direction. Similarly, the satellite in direction 314 is not visible from the elements located on the tail 310. Thus, the beam in that direction is formed from elements on the wing 304, the nose 306, and the top 308 of the aircraft. As the aircraft and the GPS satellites move, the array processor selects array elements to combine in order to account for changing fields of view. Of course, any number of array elements may be placed on any surface of an aircraft or other structure and still fall within the spirit and scope of the present invention.

Figure 4:
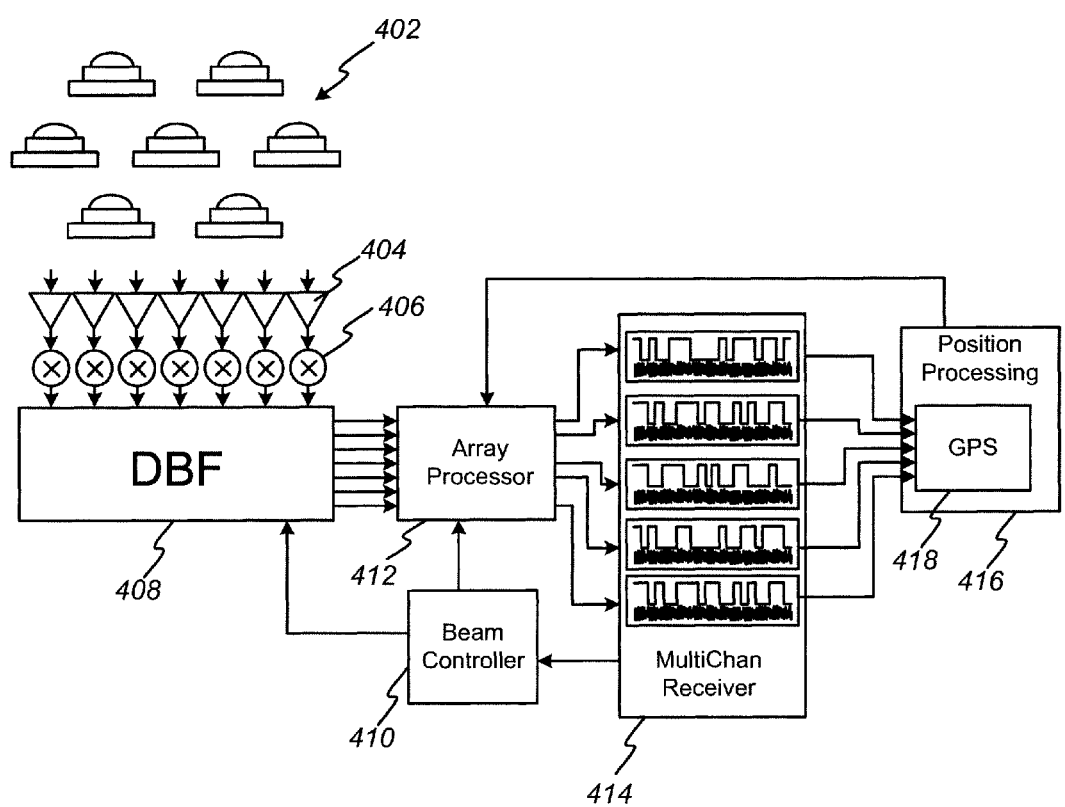
FIG. 4 depicts a block diagram of a multi-beam GPS receiving system in accordance with the present invention.

FIG. 4 is a simplified block diagram of a multibeam GPS receiving system in accordance with the present invention. Antenna array elements 402 receive GPS signals that are then amplified by low-noise amplifiers (LNAs), e.g. 404, and frequency down-converted e.g., 406, and then processed by a digital beam forming (DBF) processor 408. The DBF processor adjusts amplitude and phase of the incoming signals by a weight-and-sum process. The weighting step comprises individually multiplying the signals from each element by a complex weighting coefficient. The complex weighting coefficient applied to each signal properly adjusts the amplitude and phase of the signal on a per-sample basis to compensate for the path differences among the elements for a desired beam direction. The weighted signals from each element from a source at the selected beam direction are thus brought into coherence. When the weighted signals are added, radiated power from sources near the selected direction will add party coherently, and power from sources far from the desired direction will add incoherently. Thus, the weight-and-sum process is a dot product of two vectors: the signal vector consists of the set of signals received by the individual receiving elements, and the beam weighting vector consists of the complex weighting coefficients representing the required amplitude and phase, or I/O adjustments needed to create a beam in the selected direction.

In order to form multiple simultaneous beams looking in different directions, multiple beam weighting vectors (BWVs) are used to form multiple dot products with the same received signal vector. All array elements can be combined to form a single low-gain beam covering the entire field of view (FOV), or multiple high-gain beams pointed in various directions, each covering only a fraction of the entire FOV. The array processor may also select groups of elements to be combined to form various beams simultaneously. The array processor 412 may instruct the DBF 408 to use adaptive array processing algorithms that associate an appropriate weighting factor with each of the processed beam outputs before summing them. This provides beam shaping capability by allowing deep gain suppression features to be formed in the antenna pattern in the directions of interfering signals. The array processor 412 then routes the DBF beam outputs to selected correlators within the multichannel receiver 414 that runs correlations with the GPS satellites in the array FOV. A GPS receiver 418 then generates location information from the received correlated signals.

In order to reject interfering signals, the array processor 412 must first determine from which the direction the undesired signal is arriving. This is done by performing an iterative spatial search by taking advantage of the beam forming capabilities of the array 402 and the digital beam forming processor 408. For example, an undesired signal that is affecting one of the GPS constellation satellites may cause the position processor 416 to fail. The array processor 412 may instruct the DBF 408 to create two beams, each covering half of the sky. The satellites viewed by each of these half-coverage beams would be correlated to obtain GPS location information. If the signals from one of the half-beams failed to correlate or produced inconsistent results, the location of the interference would be isolated to that half beam. This region could then be further subdivided into quarter beams, and still further, until a precise pointing location of the interference is found.

Another method of locating undesired or interfering sources in accordance with the present invention is to create multiple spot beams, each tracking an individual satellite within the field of view. For example, six spot beams might be created by grouping elements of the array, and each could be steered to one of six available constellation satellites (see FIG. 2). Then one of the beams, e.g., 206, could be turned off, and navigation information acquired by analyzing the signals from the remaining five satellites. The sixth beam could then be turned back on and a different one turned off. This process would be repeated to obtain six separate measurements of the navigation data. By examining the measurements for consistency, the effect of dropping each satellite individually can be determined, and the signal subject to the undesired interference can be determined. The identified source can then be marked in the receiving system, and signals from this source can be suppressed, for example, by shaping the array pattern to minimize gain in that direction. Of course, other spatial search methods could also be used based on the ability of the DBF 408 to combine array elements 402 to form various radiating and receiving patterns, and these methods would also fall within the scope and spirit of the present invention.

Once the direction of the interfering source is found, its effect can be severely suppressed by shaping the array pattern to minimize gain in that direction. The depth of the gain suppression feature and its width are governed primarily by the spacing of the array elements. Thus, the array processor 412 selects elements that are maximally spaced in the direction of a plane normal to the interference direction. The signals received by these elements are then weighted and summed in order to maintain array gain in the direction of the desired signal while minimizing gain in the direction of the interfering signals. By this method, suppression ratios of over 50 dB can be obtained. With proper array geometries, the array processor can instruct the DBF to suppress the effects of close-in mainlobe interferences. The extent to which the nearby desired signal is affected depends on the array angular resolution, which in turn depends on how far apart the selected array elements are.

Figure 5:
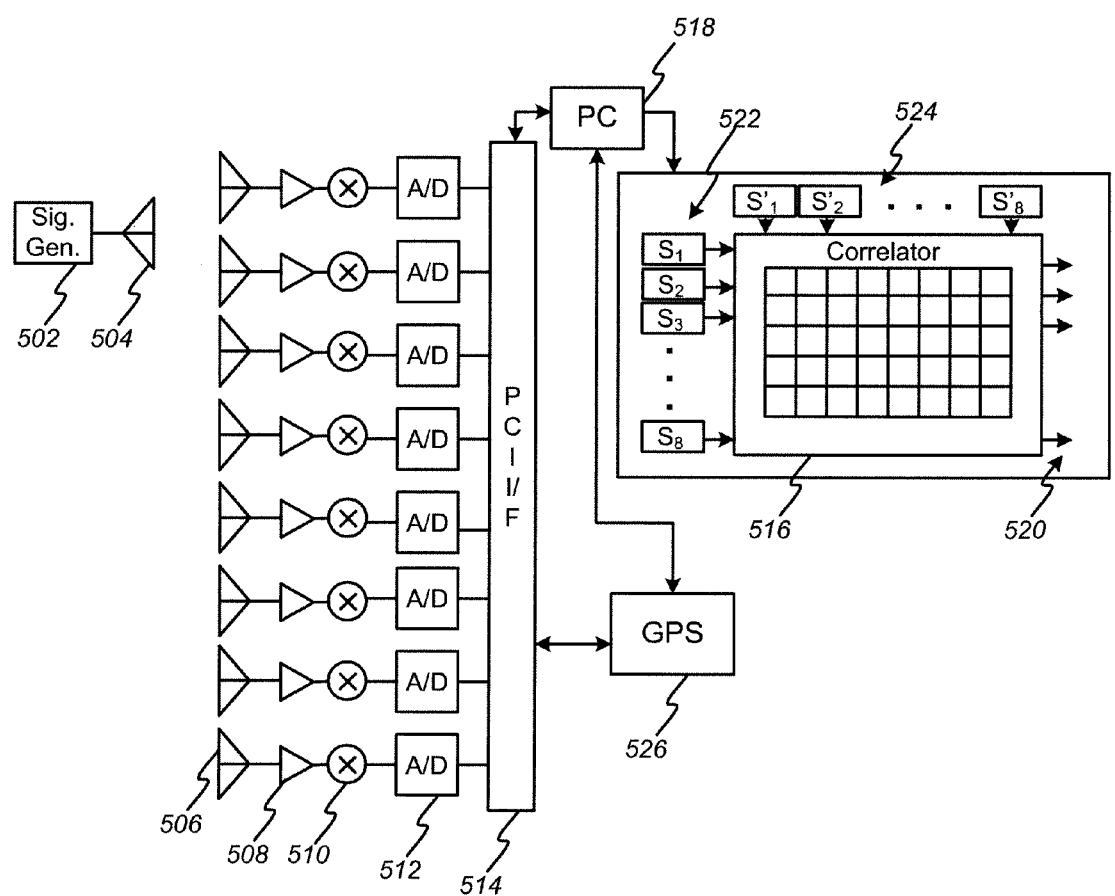
FIG. 5 is a block diagram of a laboratory or test-range calibration system for a non-planar multi-beam GPS receiving system in accordance with the present invention.

Both beam forming and pattern shaping are accomplished by applying weighting vectors, which can be derived by forming cross-correlations between the elements of the aperture. In a planar array where all of the elements are evenly spaced and have the same field of view, cross correlations among the elements becomes a simple one-dimensional matrix. For a more general array that may be irregular and non-planar, the cross correlation is a two-dimensional matrix. The array must be calibrated in order to determine the proper weight factors to apply to the antenna array elements in order to steer the beams. FIG. 5 illustrates this calibration process for an embodiment of a GPS receiving system in accordance with the present invention. The calibration procedure is performed once after the array elements have been mounted in their final configuration. For example, an array comprising elements conformally mounted onto surfaces of an aircraft could be calibrated in situ in the aircraft hangar (see FIG. 3).

The goal of the calibration process is to measure the beam weight vectors for the aperture associated with spot beams at different beam-pointing directions. These beam weight vectors are the output 520 of a correlator 516 that cross-correlates the measured signals, 522 and 524, from all of the array elements, e.g. 506, of the aperture for a given beam pointing direction. The signal from each element, e.g., 506, is received by a low-noise amplifier (LNA), 508, is frequency down-converted 510, and digitized by an analog-to-digital converter (ADC) 512. The digital data is collected over a PCI interface 514, and sent to a PC 518. The PC then delivers measured signal data to a cross-correlator 516. Of course, interfaces known in the art other than PCI may also be used, and general purpose processors, DSP systems, dedicated hardware processors, or other processing systems known in the art may be used instead of a PC to process the array data.

A signal generator 502 and its associated antenna 504 are placed at numerous locations in the far field of the aperture. For each position to be measured, the received signals from one element, e.g, $S_1$, is taken as a reference. This signal is cross-correlated 516 with all of the other signals 522 in order to calculate the proper weighting vectors 520 that compensate for the path-length differences among the array elements with respect to signals from a desired direction, making all of the weighted signals sum together in phase. Note that this alignment of phase vectors can be performed despite the fact that the aperture elements, e.g., 506, may not be coplanar or oriented in the same direction: the calibration method takes advantage of a coding sequence to essentially add an additional constraint to the phasing algorithm. The sequence-coded signals are broadcast by the signal generator 502, and a simple receiver 526 in the calibration system measures range information with respect to the location of the signal generator by synchronizing to the coded sequence by methods well known in the art. This measurement allows the variation in range resulting from the non-planar nature of the aperture elements, and the unbalanced channel amplitudes and phases, to be compensated for in the calculation of the weight vectors. The correlating vectors can subsequently be used to derive the beam weight vector (BWV) for a spot beam that incorporates both the phase gradients of a given spot beam and the associated unbalanced bias among the multiple RF channels of the DBF array. Sets of BWVs, corresponding to more beam positions than the number of array elements, can then be used to derive and separate out the contributions of RF electronics bias and those of aperture phase progression. With this information, new BWVs can be calculated to create either full-array or partial-array spot beams, shaped beams, or beams with deeply suppressed directional gain in the direction of specified undesired signals.

It should be noted that in the case of non-planar arrays, the field of view of some elements may be obscured by structural elements of the antenna for certain beam directions. These elements thus cannot be used to form a beam in this direction, and they must be eliminated from the cross correlation for calculation of beam weighting vectors for this direction. Thus, the calibration algorithm will set a received signal threshold above which an element will be involved in the correlation process.

For large arrays operated over a large bandwidth, both time delay and phase rotation must be taken into account for beam forming and pattern shaping. However, the number of elements in GPS receiver arrays tends to be less than fifteen or so, the maximum spacing is generally less than about ten wavelengths, and the signal bandwidths tend to be less than 10%. With such constraints, phase rotation compensation alone in the determination of element weights will generally be sufficient for the GPS beam forming process. However, the time delays for large moving platforms can also be equalized using the same techniques with advanced signal processing methods known in the art such as Finite-Impulse-Response (FIR) filtering.

Figure 6:
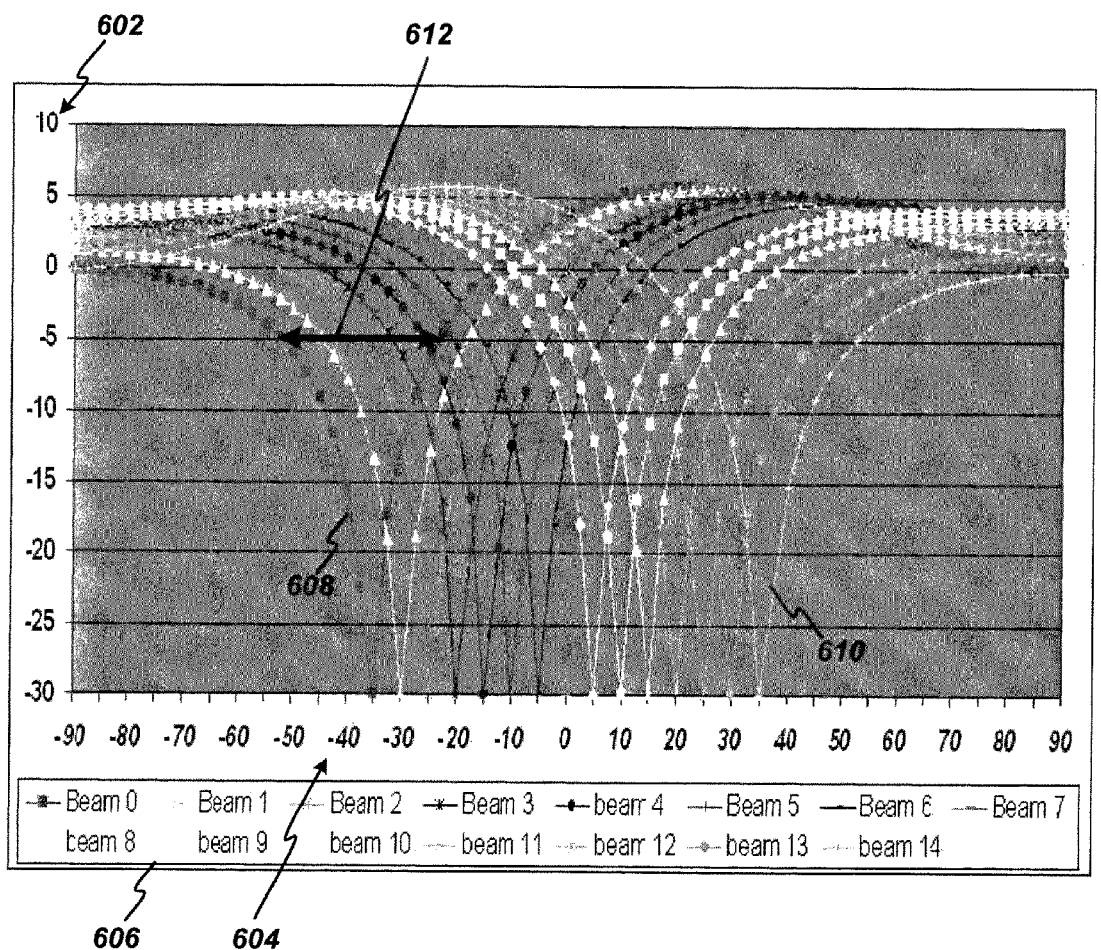
FIG. 6 illustrates an example of beam shaping using a GPS receiving system in accordance with the present invention.

FIG. 6 depicts an example of directional gain suppression features in accordance with an embodiment of the present invention using a simple antenna comprising two patch elements. A null in the radiation pattern at a particular angle is generated by weighting and summing the signals from the two patch elements. In FIG. 6, the radiation intensity in dB is plotted along the vertical axis 602 as a function of the angle in degrees from vertical, which is plotted along the horizontal axis 604. Each radiating patch in this example has a size of $\lambda/4$, where $\lambda$ is wavelength of the radiated signal. The boresite gain of each patch is 3 dB, and the two elements are spaced by a distance of $\lambda/2$. Each of the fifteen traces plotted in the figure and listed in the key 606 corresponds to a different set of weighting factors applied to the two elements. In this example, only the phase of the signals are adjusted, although more generally, both amplitude and phase may be adjusted. The null is swept from the trace 608 at −35 degrees to the trace 610 at +35 degrees by varying the relative phase between the signals from the two radiating elements as they are summed. At the finite grid spacing of this example, the null depth extends beyond 30 dB. However, with 10-bit-precision weighting factors, the depth of the calculated nulls are more than 50 dB.

In this example, the width of the null, defined as 5 dB below the asymptotic level and indicated as element 612, is about thirty degrees. Thus, an interfering source located 15 degrees from a GPS satellite and having an interference to signal ratio of 1/1 could be suppressed by 25 dB relative to the desired GPS signal by properly suppressing the gain of the array in the direction of the interference, even with this simple 2-element system. In general, as the separation between array elements is made larger, the angular width of the gain suppression features will decrease.

Another embodiment of a GPS receiver system in accordance with the present invention enables the simultaneous use of multiple independent space-based navigation systems such as the proposed Galileo or Compass systems. The aperture can be used to form multiple beams for multiple systems simultaneously. Each beam may track an individual satellite or multiple satellites from different systems. Of course, the frequency of operation of the various systems must lie within the operating bandwidth of the aperture. The system may utilize all available space assets, thus providing better availability and improving the integrity of position and timing measurement. Alternatively, the advanced multiple-beam GPS antenna may be configured to operate using one space-based navigation system only, remaining completely isolated from the other systems that use the same waveforms and the same frequency band.

Thus, an advanced GPS receiving system that is capable of generating multiple beams simultaneously and dynamically detecting and suppressing multiple interference signals is achieved. Those skilled in the art will likely recognize further advantages of the present invention, and it should be appreciated that various modifications, adaptations, and alternative embodiments thereof may be made within the scope and spirit of the present invention. The invention is further defined by the following claims.

What is claimed is:

1. In a Global Positioning System (GPS) receiver system comprising a plurality of antenna elements configured as a receiving array, a GPS position processing unit, a digital beam forming (DBF) processor, an array processor, and a plurality of signal-generating units, a method of calibrating the GPS receiver system to determine beam weighting vectors for a shaped beam comprising at least one directional gain suppression feature and at least one gain enhancement feature comprises the steps of:

placing the plurality of signal-generating units at selected calibration locations in the far field of the receiving array at known angles and ranges to the receiving array;

simultaneously broadcasting radio-frequency signals modulated by corresponding acquisition codes from the plurality of signal-generating units;

simultaneously receiving the signals from the plurality of signal generating units by the plurality of antenna elements;

digitizing the signals received by the plurality of antenna elements;

collecting range data associated with each of the plurality of antenna elements;

selecting a reference signal from among the signals received by the plurality of antenna elements;

for each of the corresponding acquisition codes, correlating each one of the signals received by the plurality of antenna elements with the selected reference signal;

identifying a peak correlation value corresponding to each of the corresponding acquisition codes;

calculating a plurality of beam weighting vectors (BWVs) associated with each of the plurality of antenna elements for each one of the corresponding acquisition codes;

loading the plurality of BWV's into the array processor such that the shaped beam is configured to point the at least one gain enhancement feature in a direction toward a first one of the plurality of signal generators and to simultaneously direct the at least one gain suppression feature in a direction of a second one of the plurality of signal generators;

correlating the signals received by the plurality of antenna elements with the selected reference signal while the at least one gain suppression feature is directed toward the one of the plurality of signal generators;

identifying a peak correlation value corresponding to the shaped beam having the at least one gain suppression feature directed toward the second one of the plurality of signal generators;

calculating BWVs for each of the antenna elements; and storing the plurality of BWVs in the array processor.

2. The method of claim 1, wherein the step of calculating a plurality of beam weighting vectors further comprises at least one of the steps of:

calculating phase correction factors;

calculating time-delay correction factors; and calculating amplitude correction factors.

3. The method of claim 1, wherein the step of calculating a plurality of beam weighting vectors further comprises the step of compensating for antenna elements that do not lie in the same plane by applying correction factors obtained from range data collected from the GPS position-processing unit.

4. The method of claim 1, wherein the step of calculating a plurality of beam weighting vectors further comprises the step of compensating for electronics bias in amplitudes and phases among antenna elements by applying correction factors obtained from range data collected from the GPS position-processing unit.

* * * * *